US012755342B2

(12) United States Patent
Tawada

(10) Patent No.: US 12,755,342 B2
(45) Date of Patent: Oct. 6, 2026

(54) IMAGE PROCESSING APPARATUS CAPABLE OF BOTH IMPROVING IMAGE QUALITY AND REDUCING AFTERIMAGES WHEN COMBINING PLURALITY OF IMAGES, CONTROL METHOD FOR IMAGE PROCESSING APPARATUS, AND STORAGE MEDIUM

(71) Applicant: CANON KABUSHIKI KAISHA, Tokyo (JP)

(72) Inventor: Noriaki Tawada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 18/415,831

(22) Filed: Jan. 18, 2024

(65) Prior Publication Data

US 2024/0249388 A1 Jul. 25, 2024

(30) Foreign Application Priority Data

Jan. 25, 2023 (JP) ................................ 2023-009400

(51) Int. Cl.
*G06T 5/50* (2006.01)
*G06T 3/40* (2006.01)
(Continued)

(52) U.S. Cl.
CPC .................. *G06T 5/50* (2013.01); *G06T 3/40* (2013.01); *G06T 5/90* (2024.01); *G06V 10/245* (2022.01);
(Continued)

(58) Field of Classification Search
CPC .... G06T 5/50; G06T 5/90; G06T 3/40; G06T 2207/20081; G06T 2207/20221; G06V 10/245
(Continued)

(56) References Cited

U.S. PATENT DOCUMENTS 11,688,074 B2 6/2023 Puri
2017/0280066 A1 9/2017 Hayashi
(Continued)

FOREIGN PATENT DOCUMENTS

JP 2011077820 * 9/2009 ............. H04N 5/232
JP 2022-058135 A 4/2022

OTHER PUBLICATIONS

Zhihao Xia, et al., "Basis Prediction Networks for Effective Burst Denoising With Large Kernels," Proceedings of the IEEE/CVF Conference on Computer Vision and Pattern Recognition (CVPR), 2020, pp. 11844-11853.

*Primary Examiner* — Jin Ge
(74) *Attorney, Agent, or Firm* — Venable LLP

(57) ABSTRACT

An image processing apparatus capable of improving image quality and reducing afterimages at the same time when combining a plurality of images. A plurality of frame images including a basis frame image as a basis for combining the plurality of frame images is obtained. A third image group including superimposed images is generated by superimposing a second image on each of the frame images. The basis frame image is obtained as a training image. An input image group is generated by performing an image processing on the frame images and the second image, or the superimposed images. The image processing model is trained based on an error between an image output from the image processing model by inputting the input image group into the image processing model, and the training image. Positions at which the second image is superimposed on the frame images are different for the frame images.

18 Claims, 5 Drawing Sheets

(51) Int. Cl.
*G06T 5/90* (2024.01)
*G06V 10/24* (2022.01)

(52) U.S. Cl.
CPC ............... *G06T 2207/20081* (2013.01); *G06T 2207/20221* (2013.01)

(58) Field of Classification Search
USPC .......................................................... 345/629
See application file for complete search history.

(56) References Cited

U.S. PATENT DOCUMENTS

| | | | | |
|---|---|---|---|---|
| 2019/0295225 | A1 * | 9/2019 | Saito | H04N 1/409 |
| 2020/0090629 | A1 * | 3/2020 | Yokoyama | G06F 3/013 |
| 2022/0101047 | A1 | 3/2022 | Puri | |
| 2022/0327365 | A1 * | 10/2022 | Kubota | G06V 10/82 |
| 2022/0383034 | A1 * | 12/2022 | Sommerlade | G06V 10/82 |
| 2022/0398698 | A1 * | 12/2022 | Li | G06N 3/0464 |

* cited by examiner

IMAGE PROCESSING APPARATUS CAPABLE OF BOTH IMPROVING IMAGE QUALITY AND REDUCING AFTERIMAGES WHEN COMBINING PLURALITY OF IMAGES, CONTROL METHOD FOR IMAGE PROCESSING APPARATUS, AND STORAGE MEDIUM

BACKGROUND OF THE INVENTION

Field of the Invention

The present invention relates to an image processing apparatus, a control method for the image processing apparatus, and a storage medium.

Description of the Related Art

In recent years, deep learning that performs learning with a multi-layer neural network has been known. Deep learning is used in various kinds of fields such as image processing, speech processing, and language processing. For example, Japanese Patent Laid-Open Publication (Kokai) No. 2022-58135 discloses a configuration in which learning data for increasing the robustness of a gesture recognition model is generated by recognizing and obtaining a human hand in an image and combining it with another background image. Furthermore, Non-Patent Literature 1 (Zhihao Xia, Federico Perazzi, Michael Gharbi, Kalyan Sunkavalli, Ayan Chakrabarti; Basis Prediction Networks for Effective Burst Denoising With Large Kernels. Proceedings of the IEEE/CVF Conference on Computer Vision and Pattern Recognition (CVPR), 2020, pp. 11844-11853) discloses a configuration in which a neural network is used for an image noise reduction processing. The configuration disclosed in the Non-Patent Literature 1 aims to improve a resolution feeling after the image noise reduction processing, that is, aims to improve image quality after the image noise reduction processing by inputting a plurality of images, i.e., a burst image including a plurality of frames and combining them together as compared to a case where only one image is inputted. Moreover, the configuration disclosed in the Non-Patent Literature 1 is capable of reducing afterimages of moving parts in the burst image. In reducing the afterimages, learning is performed by inputting an image patch (a burst image patch) including a plurality of frames in which motions are given between the frames. In addition, the learning is performed by using the burst image (see, for example, FIG. 4A) in which the entire image patch is caused to shift by shifting a cutout position of the patch between the frames.

In combining a plurality of images, when reducing afterimages caused by relatively large motions, the amount of motion to be learned needs to be set to a large amount. However, according to the method in which the entire image patch is shifted as disclosed in the Non-Patent Literature 1, the resolution feeling at the time of outputting a composite image obtained by image composition (combining the plurality of images) tends to deteriorate at the cost of reducing the afterimages. In particular, as a preprocessing for the image composition, in the case that alignment between a plurality of input images is performed, the motions of the entire screen are largely absorbed by the alignment, and only local motions (for example, motions of moving objects such as a human and a vehicle) remain. At this time, as learning of the motions, shifting of the entire image patch becomes excessive, and the resolution feeling, which is an advantage of the image composition, is impaired.

Moreover, according to the configuration described in Japanese Patent Laid-Open Publication (Kokai) No. 2022-58135, a predetermined image is combined with a part of another image to generate the learning data used in a neural network. Japanese Patent Laid-Open Publication (Kokai) No. 2022-58135, however, relates to image recognition of still images and does not disclose learning of the motions in the image composition.

SUMMARY OF THE INVENTION

The present invention provides an image processing apparatus that is capable of both improving image quality and reducing afterimages when combining a plurality of images, a control method for the image processing apparatus, and a storage medium.

Accordingly, the present invention provides an image processing apparatus that performs learning of an image processing model for combining a plurality of images, comprising at least one processor, and a memory coupled to the processor storing instructions that, when executed by the processor, cause the processor to function as a first obtaining unit that obtains a first image group, which includes a plurality of frame images including a basis frame image that becomes a basis for combining the plurality of images, a second obtaining unit that obtains a second image, a first generating unit that generates a third image group, which includes superimposed images obtained by superimposing the second image on each of the frame images, a third obtaining unit that obtains the basis frame image of the third image group as a training image, a second generating unit that generates an input image group by performing an image processing with respect to the frame images and the second image, or the superimposed images, and a learning unit that performs the learning of the image processing model based on an error between an output image outputted from the image processing model by inputting the input image group into the image processing model, and the training image. The first generating unit makes superimposing positions of the second image on each of the frame images different for each of the frame images.

According to the present invention, it is possible to both improve the image quality and reduce the afterimages when combining the plurality of images.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Hereinafter, a preferred embodiment of the present invention will be described in detail with reference to the accompanying drawings. However, configurations described in the following preferred embodiment are examples for illustrative purposes only, and the scope of the present invention is not limited by the configurations described in the following preferred embodiment. For example, respective components constituting the present invention can be replaced with those having arbitrary configurations that are capable of performing the same functions.

Figure 1:
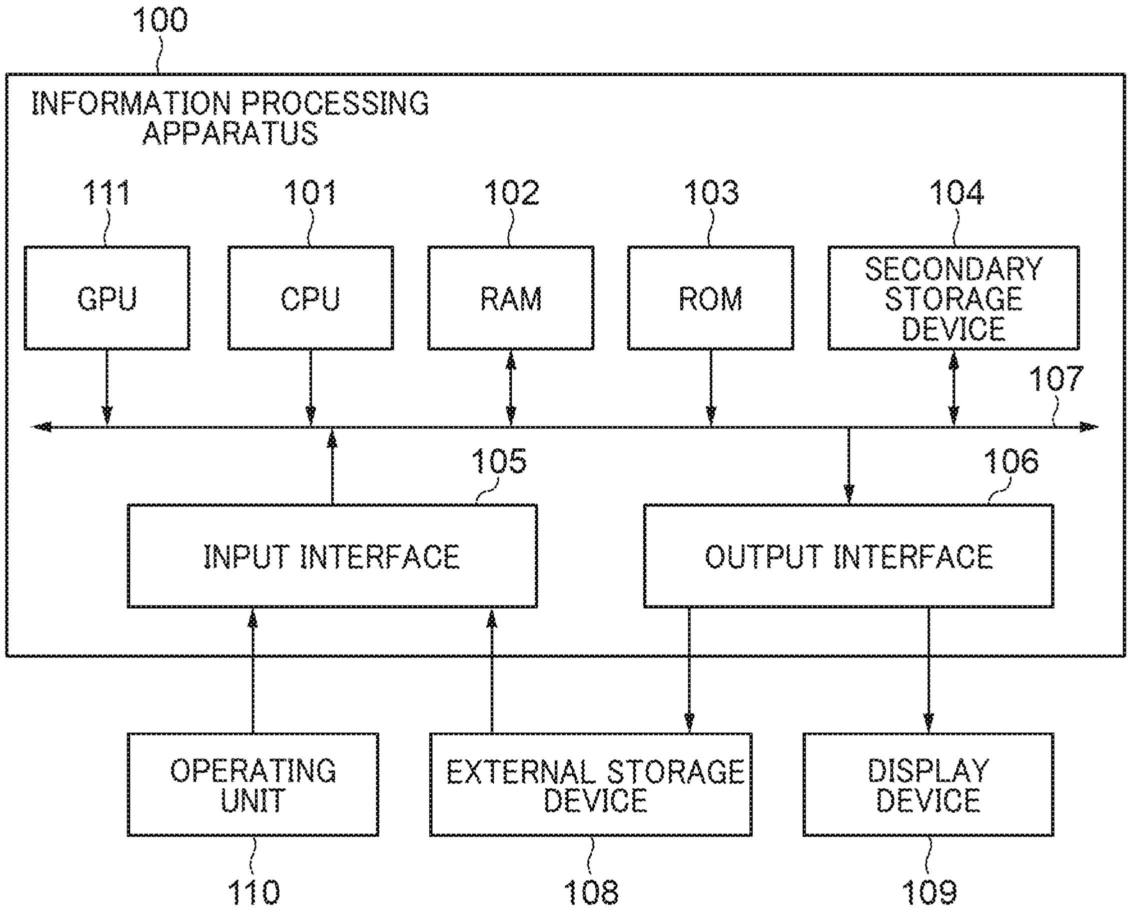
FIG. 1 is a block diagram that shows an example of a hardware configuration of an information processing apparatus.

FIG. 1 is a block diagram that shows an example of a hardware configuration of an information processing apparatus 100. The information processing apparatus 100 shown in FIG. 1 is an image processing apparatus that performs learning of an image processing model for combining a plurality of images (trains the image processing model), and is installed in, for example, an image pickup apparatus. The information processing apparatus 100 includes a central processing unit (CPU) 101, a random access memory (RAM) 102, a read only memory (ROM) 103, a secondary storage device 104, an input interface 105, an output interface 106, and a GPU 111. These components constituting the information processing apparatus 100 are communicably connected to each other via a system bus 107. It should be noted that the information processing apparatus 100 may include components other than the CPU 101, the RAM 102, the ROM 103, the secondary storage device 104, the input interface 105, the output interface 106, and the GPU 111. In addition, the information processing apparatus 100 is communicably connected to an external storage device 108 and an operating unit 110 via the input interface 105. Furthermore, the information processing apparatus 100 is communicably connected to the external storage device 108 and a display device 109 via the output interface 106.

The CPU 101 uses the RAM 102 as a working memory to execute programs stored in the ROM 103. Examples of the programs include programs for causing a computer to execute the respective components of the information processing apparatus 100 and respective steps of the information processing apparatus 100 (a control method for the image processing apparatus). In addition, the CPU 101 controls operations of the RAM 102, the ROM 103, the secondary storage device 104, the input interface 105, and the output interface 106 via the system bus 107. The secondary storage device 104 is a storage device that stores various types of data handled by the information processing apparatus 100. The CPU 101 is capable of writing data into the secondary storage device 104 and reading out data from the secondary storage device 104. In the present embodiment, although a hard disk drive (an HDD) is used as the secondary storage device 104, the secondary storage device 104 is not limited to the HDD and may be, for example, any one of various types of storage devices such as an optical disk drive or a flash memory. The GPU 111 is a processor for neural network computations. In the information processing apparatus 100, the CPU 101 performs processing such as data output, and the GPU 111 performs processing related to machine learning and the like. It should be noted that the processing related to machine learning and the like may be performed by the CPU 101 alone or by the GPU 111 and the CPU 101. It should be noted that in the information processing apparatus 100, for example, a tensor processing unit (a TPU) may be used in place of the GPU 111.

The input interface 105 is, for example, a serial bus interface such as a universal serial bus interface (a USB interface) or an IEEE 1394 interface. Data from the external storage device 108 is inputted into the information processing apparatus 100 via the input interface 105. The external storage device 108 is a storage device that stores various types of data handled by the information processing apparatus 100. The external storage device 108 is not particularly limited, and examples of the external storage device 108 include storage devices such as an HDD, a memory card, a compactflash memory card (a CF memory card), a secure digital memory card (an SD memory card), and a USB memory. In addition, instructions (commands) issued by a user from the operating unit 110 are inputted into the information processing apparatus 100 via the input interface 105. The operating unit 110 is not particularly limited, and examples of the operating unit 110 include input devices such as a mouse and a keyboard. As with the input interface 105, the output interface 106 is, for example, a serial bus interface such as a USB interface or an IEEE 1394 interface. It should be noted that the output interface 106 is not limited to the serial bus interface and may be, for example, a video output terminal such as a digital visual interface (DVI) output terminal or a high-definition multimedia interface (HDMI) (registered trademark) terminal. The information processing apparatus 100 outputs data to the external storage device 108 via the output interface 106. As a result, the data from the information processing apparatus 100 is stored in the external storage device 108. In addition, the information processing apparatus 100 is capable of outputting data to the display device 109 via the output interface 106. The data is, for example, image data that has been processed by the CPU 101. Furthermore, the image data is displayed on the display device 109. The display device 109 is not particularly limited, and examples of the display device 109 include various types of image display devices such as a liquid crystal display.

Figure 2:
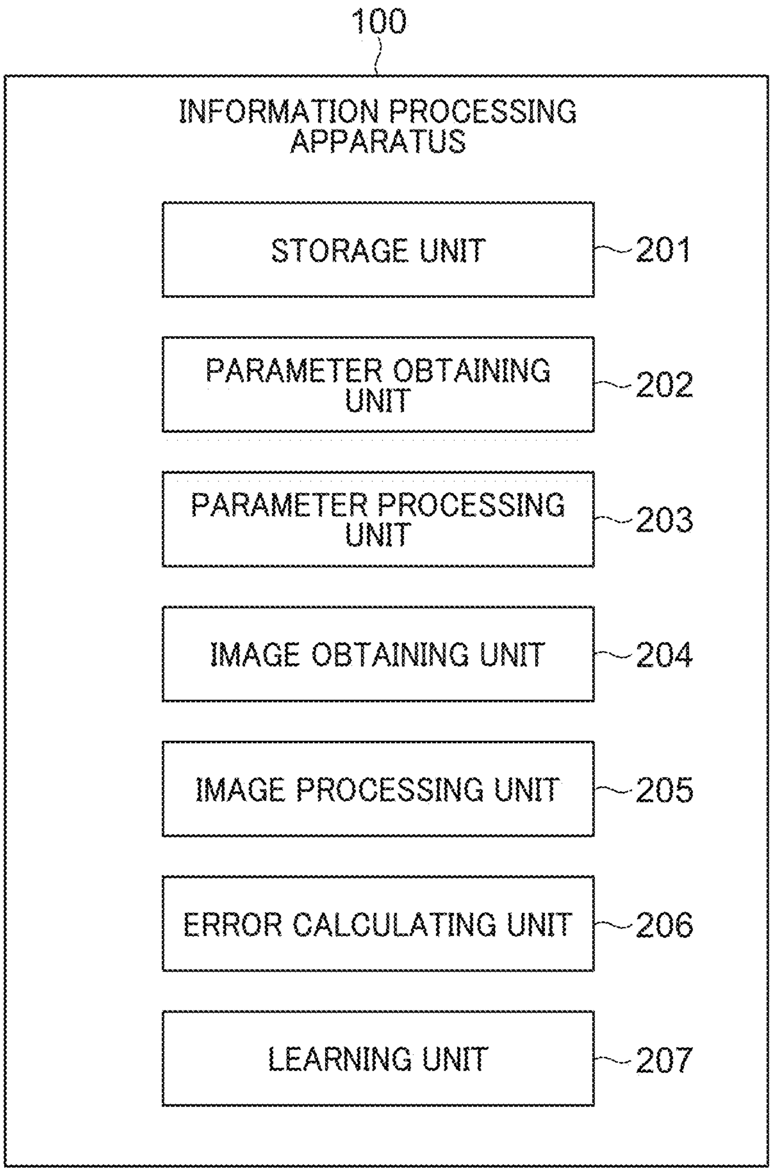
FIG. 2 is a block diagram (a functional block diagram) that shows an example of a software configuration of the information processing apparatus.
Figure 3:
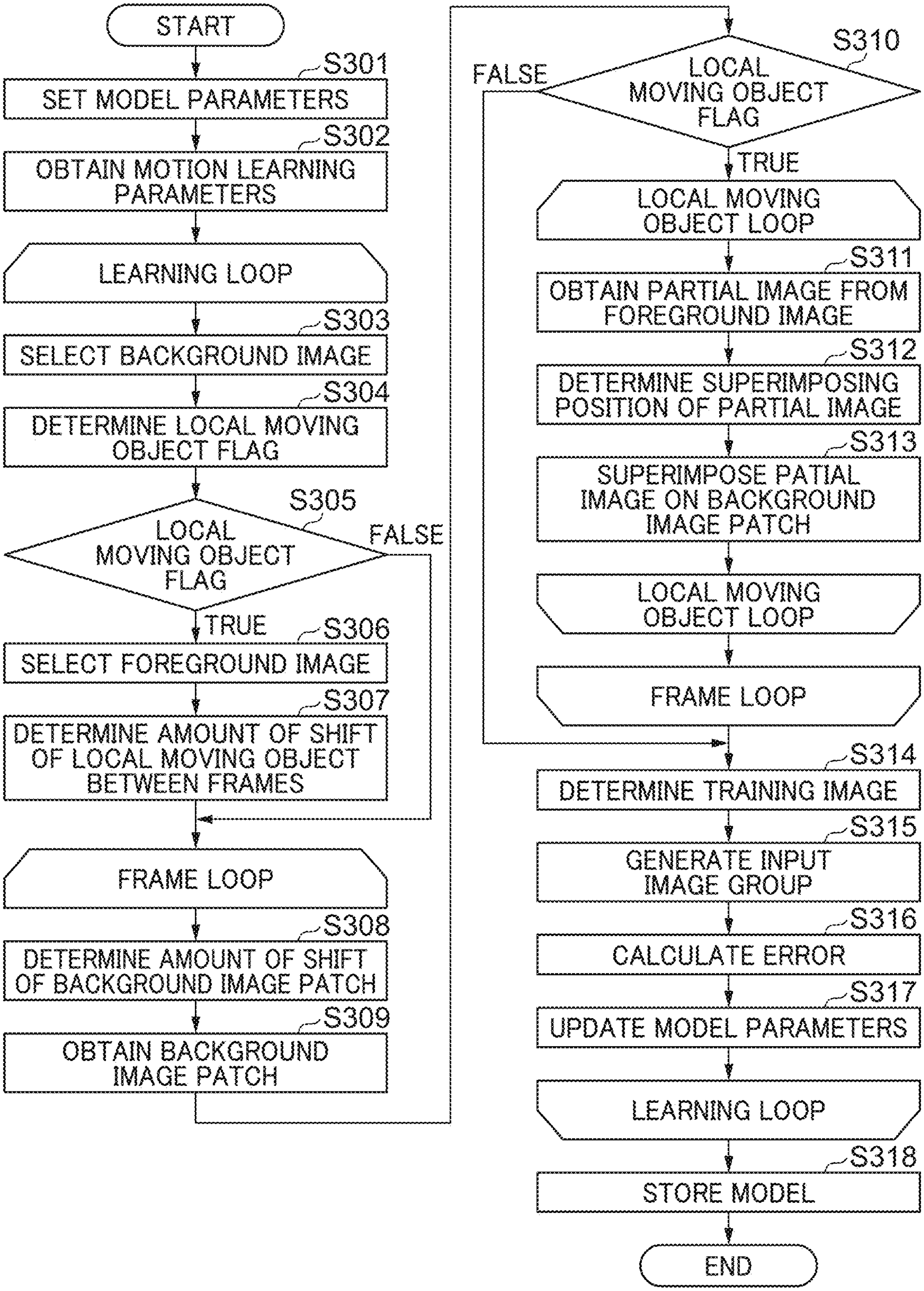
FIG. 3 is a flowchart that shows a processing that is carried out by the information processing apparatus.
Figure 4A:
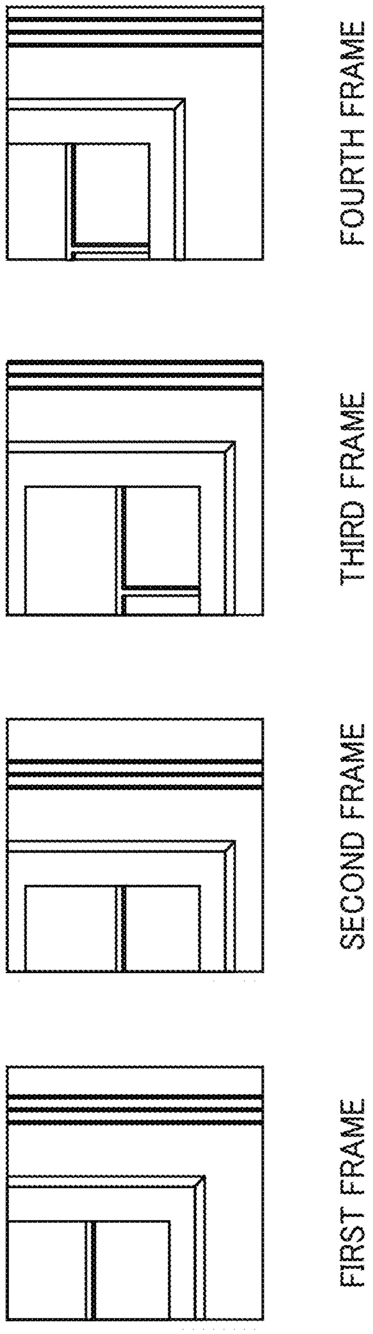
FIGS. 4A and 4B are diagrams for explaining an example of the superimposition of a plurality of images obtained by the processing carried out by the information processing apparatus.
Figure 4B:
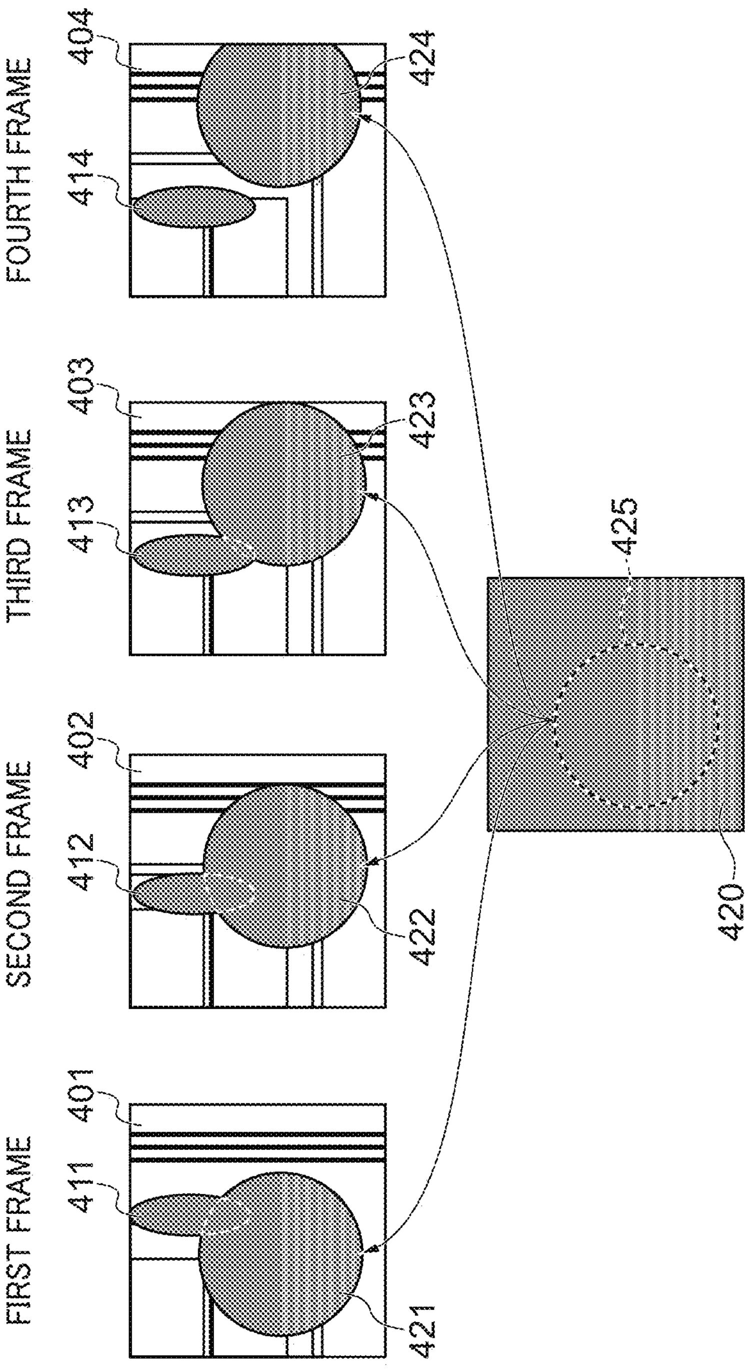

FIG. 2 is a block diagram (a functional block diagram) that shows an example of a software configuration of the information processing apparatus 100. As shown in FIG. 2, the information processing apparatus 100 includes functional units that are a storage unit 201, a parameter obtaining unit 202, a parameter processing unit 203, an image obtaining unit 204, an image processing unit 205, an error calculating unit 206, and a learning unit 207. These functional units are capable of being realized by one or a plurality of the CPU 101, the RAM 102, the ROM 103, the secondary storage device 104, the input interface 105, the output interface 106, and the GPU 111. The respective functional units will be described with reference to FIGS. 3, 4A, and 4B. FIG. 3 is a flowchart that shows a processing that is carried out by the information processing apparatus 100. Furthermore, FIGS. 4A and 4B are diagrams for explaining an example of the superimposition of a plurality of images obtained by the processing carried out by the information processing apparatus 100. As shown in FIG. 4B, in the information processing apparatus 100, learning that simulates a locally moving object (hereinafter, referred to as "a local moving object") is performed by making superimposing positions on a plurality of images where a partial image of another image is superimposed differ from each other for each frame image. In addition, hereinafter, in the case that two directions perpendicular to each other on the image are set as a first direction and a second direction, the first direction is a horizontal direction, and the second direction is a vertical direction.

As shown in FIG. 3, in a step S301, the learning unit 207 sets parameters of the image processing model for combining the plurality of images. The image processing model is preferably a learning model using a neural network, and may be, for example, a learning model using a convolutional neural network (a CNN) or a learning model using a recurrent neural network (an RNN). Thus, the image processing model is capable of performing deep learning. Machine learning is not limited to deep learning, and may be, for example, machine learning using arbitrary machine learning algorithm such as a support vector machine, a logistics regression, or a decision tree. It should be noted that in the present embodiment, machine learning is supervised learning. In addition, the image processing model may be a model using a transformer. The parameters of the image processing model are mainly parameters related to weights of the neural network (hereafter, referred to as "weight parameters"). The weight parameters are typically initialized with random numbers, and in the case of performing additional learning based on an existing model, are loaded (read) into the existing model that is held in the storage unit 201. In addition, the parameters of the image processing model may also include, for example, parameters relating to setting of a learning rate and an optimizer (an optimization algorithm) in machine learning.

In a step S302, the parameter obtaining unit 202 obtains parameters relating to motion learning in the image processing model (hereafter, referred to as "motion learning parameters"). Specifically, "the motion learning parameters" include a shift probability of the entire patch image that is a frame image, its maximum horizontal shift amount and its maximum vertical shift amount, an occurrence probability of local moving objects, the number of the local moving objects, and a maximum horizontal shift amount and a maximum vertical shift amount of the local moving object between frames. These motion learning parameters are, for example, designated by the user via the operating unit 110 of the information processing apparatus 100.

Steps S303 to S317 after the step S302 are processing in learning that update the weight parameters, and are therefore executed in a learning loop. In the learning loop, for example, learning of a predetermined data set is performed for a predetermined number of epochs.

In the step S303, the image obtaining unit 204, which functions as a first obtaining unit, obtains a first image group including a plurality of frame images (a first obtaining step). In the present embodiment, the image obtaining unit 204 selects (for example, randomly selects) a plurality of background images as the plurality of frame images from data sets of still images stored, i.e., held in the storage unit 201. In addition, the plurality of frame images includes a basis frame image, which will be described below. The basis frame image is an image that becomes a basis for combining the plurality of images.

In the step S304, based on the occurrence probability of the local moving objects obtained in the step S302, the parameter processing unit 203 determines a local moving object flag for a burst image patch that is to be generated now in the current learning loop. For example, in the case that the occurrence probability of the local moving objects is 0.3 (30%), a random number from 0 to 1 is generated. In the case that the random number is 0.3 or less, the parameter processing unit 203 determines that the local moving object flag is "TRUE", and on the other hand, in the case that the random number exceeds 0.3, the parameter processing unit 203 determines that the local moving object flag is "FALSE".

In the step S305, based on the determination in the step S304, the parameter processing unit 203 judges the local moving object flag. As a result of the judgement in the step S305, in the case that the parameter processing unit 203 judges that the local moving object flag is "TRUE", the processing proceeds to the step S306. On the other hand, as the result of the judgement in the step S305, in the case that the parameter processing unit 203 judges that the local moving object flag is "FALSE", the processing proceeds to the step S308.

In the step S306, the parameter obtaining unit 202, which functions as a second obtaining unit, obtains a second image (a second obtaining step). It is preferred that the second image is an image obtained from the first image group. In the present embodiment, the image obtaining unit 204 selects, for example, randomly selects a foreground image, which is a source (material) for the local moving object, as the second image from the data sets of still images stored in the storage unit 201. In addition, in the step S306, it is preferred that the same number of foreground images as the number of the local moving objects obtained in the step S302 are selected.

In the step S307, for each of the local moving objects selected in the step S306, the parameter processing unit 203 determines a horizontal shift amount and a vertical shift amount between frames in the burst image patch in the current learning loop. For example, in the case that the maximum horizontal shift amount between frames obtained in the step S302 is 16 pixels, the horizontal shift amount between frames is determined by randomly selecting from integers within a range of ±16 pixels. Likewise, for example, in the case that the maximum vertical shift amount between frames obtained in the step S302 is 4 pixels, the vertical shift amount between frames is determined by randomly selecting from integers within a range of ±4 pixels. It should be noted that in the case that the image format is a Bayer array RAW image or the like, the horizontal shift amount and the vertical shift amount are limited to even numbers, respectively.

The steps S308 to S313 after the step S307 are processing relating to each of frame images constituting a burst image, and are therefore executed in a frame loop.

In the present embodiment, it is assumed that the number of the frame images constituting the burst image (the first image group) is, for example, "4". It is also assumed that the frame image in the first frame at the beginning is the basis frame image and the frame images in the second and subsequent frames are reference frame images. The burst image including the four frame images is inputted into the image processing model. Then, an output image (a multiple composite output corresponding to the basis frame image) whose image quality has been improved as compared to a case where only one frame image is inputted, is obtained from the image processing model. It should be noted that the basis frame image is not limited to be the frame image in the first frame at the beginning and may be any one of the frame images.

In the step S308, the parameter processing unit 203 determines a horizontal shift amount and a vertical shift amount of a background image patch in each of the frame images with respect to the basis frame image.

In the present embodiment, at the time of inference using the image processing model that has been trained (learned), as a preprocessing, alignment (image stabilization, i.e., a camera shake correction) is performed. The preprocessing is a shifting processing in which the remaining frame images excluding the basis frame image are shifted in accordance with the basis frame image, that is, all the reference frame images are shifted in accordance with the basis frame image so that a position of a main subject is aligned between the frame images. By performing the preprocessing, motions of all the reference frame images caused by camera shake are largely absorbed (eliminated) before they are inputted into the image processing model. For this reason, the preprocessing is considered to be effective for the motions of all the reference frame images in training the image processing model (in learning of the image processing model). It should be noted that it is preferable to minimize the amount of shifting of the entire image patch, which tends to reduce the resolution feeling of the multiple composite output, as much as possible. Here, in the case that the alignment (the image stabilization, i.e., the camera shake correction) is an ideal correction, it is possible to omit shifting of the entire image patch, in other words, the maximum horizontal shift amount and the maximum vertical shift amount of the entire image patch may be 0 pixels. However, actually, since camera shake correction remaining occurs, it is preferable to set the maximum horizontal shift amount and the maximum vertical shift amount of the entire image patch to, for example, 2 pixels, depending on the accuracy of the alignment (an assumed amount of the camera shake correction remaining). It should be noted that in the case that the shift probability of the entire image patch is 100%, there is a possibility that even a burst image for which the camera shake is prevented by, for example, shooting using a tripod will have blurry lines when a plurality of frame images is combined after thin line groups in the frame images are unnecessarily moved. For this reason, by setting the shift probability of the entire image patch to, for example, approximately 50%, it is possible to deal with the camera shake correction remaining, and it is also possible to prevent from blurring of lines.

Based on the above description, in the step S308, the parameter processing unit 203 determines the horizontal shift amount and the vertical shift amount of the background image patch. First, since the frame image in the first frame is the basis frame image, the horizontal shift amount and the vertical shift amount of the background image patch are set to 0 pixels. Next, for the reference frame images that are the frame images in the second and subsequent frames, a random number from 0 to 1 is generated, in the case that, for example, the shift probability of the entire image patch is 0.5 (50%), and the maximum horizontal shift amount and the maximum vertical shift amount are 2 pixels. Then, in the case that the random number is 0.5 or less, the horizontal shift amount and the vertical shift amount of the background image patch are determined by randomly selecting from integers within a range of ±2 pixels, respectively. On the other hand, in the case that the random number exceeds 0.5, the horizontal shift amount and the vertical shift amount of the background image patch are determined to be 0 pixels, respectively.

In the step S309, the image obtaining unit 204 obtains an image in which a cutout position of each patch image (each frame image) has been shifted. In the present embodiment, based on the horizontal shift amount and the vertical shift amount of the background image patch in each frame image determined in the step S308, the cutout position of the patch image from the background images selected in the step S303 is shifted. As a result, the background image patch of each frame image is obtained. For easier understanding, in the case that the range of the horizontal shift amount and the range of the vertical shift amount are larger than ±2 pixels, respectively, as shown in FIG. 4A, the background image patch becomes a burst image with motion in which the entire image patch shifts.

In the step S310, based on the determination in the step S304, the parameter processing unit 203 judges the local moving object flag. As a result of the judgement in the step S310, in the case that the parameter processing unit 203 judges that the local moving object flag is "TRUE", the processing proceeds to the step S311. On the other hand, as the result of the judgement in the step S310, in the case that the parameter processing unit 203 judges that the local moving object flag is "FALSE", the processing proceeds to the step S314.

The steps S311 to S313 after the step S310 are processing for each of the local moving objects obtained in the step S302, and are therefore executed in a local moving object loop. In the present embodiment, it is assumed that the number of the local moving objects is two.

In the step S311, the image obtaining unit 204 obtains a partial image, which becomes the local moving object, from the foreground image, which corresponds to the local moving object and is obtained in the step S306. Specifically, for example, a size of the partial image not greater than an image patch size is randomly determined. In addition, a cutout position of the partial image obtained from the foreground image is also randomly determined. Then, based on these determinations, a circular partial image is cut out. This partial image has borderlines in various directions because it is circular, and hence it is more preferable as the second image than, for example, a square partial image. It should be noted that the shape of the partial image is not particularly limited and may be arbitrary. FIG. 4B shows an example in which a partial image 425 is obtained from a foreground image 420. It should be noted that the size and the cutout position of the partial image may be the same for each of the frame images, but this is not limitative, and they may be varied, for example, within a range of ±2 pixels between the frame images. As a result, the deformation and a distance change of the local moving object can be taken into consideration. Moreover, a change in the partial image between the frame images may be increased as the size of the partial image is increased. It should be noted that the partial image, which becomes the local moving object, is not limited to the image obtained from the foreground image, but may be, for example, an image generated by computer graphics. As a result, for example, it is possible to prepare partial images with arbitrary sizes and arbitrary shapes in advance and then store them in the storage unit 201, and hence it is possible to quickly perform obtaining of the partial image in the step S311.

In the step S312, the parameter processing unit 203 determines superimposing positions of the partial image obtained in the step S311 on the background image patch obtained in the step S309 (determines the superimposing positions at which the partial image obtained in the step S311 is superimposed on the background image patch obtained in the step S309). In the step S312, first, for the frame image in the first frame, that is, for the basis frame image, the superimposing position of the partial image in the horizontal direction and the superimposing position of the partial images in the vertical direction within the background image patch are randomly determined, respectively. Next, for the frame image in the second frame, that is, for the first reference frame, superimposing positions are determined to be positions shifted from the superimposing positions of the partial image in the frame image in the first frame by the horizontal shift amount and the vertical shift amount that are determined in the step S307. Next, as mentioned above, the superimposing position of the partial image in the horizontal direction of the frame images in the third and subsequent frames is determined to be a position shifted from the superimposing position in the horizontal direction in the previous frame image by the shift amount in the horizontal direction (for example, −12 pixels). As a result, the partial image moves in the horizontal direction, that is, the motion of the partial image becomes a horizontally flowing motion. In addition, for example, in the case that the shift amount in the vertical direction is −4 pixels, the superimposing position of the partial image in the vertical direction of the frame images in the third and subsequent frames is determined to be a position shifted within a range of ±4 pixels from the superimposing position in the vertical direction in the previous frame image. As a result, the partial image repeatedly moves vertically upward and downward, that is, the motion of the partial image becomes a vertically swinging motion. It should be noted that when shifting from the superimposing position in the horizontal direction in the previous frame image and the superimposing position in the vertical direction in the previous frame image, a variation within a range of, for example, ±2 pixels may be added. It should be noted that the maximum shift amount in the horizontal direction between frames is made differ from the maximum shift amount in the vertical direction between frames, and in the present embodiment, the maximum shift amount in the horizontal direction between frames is greater than the maximum shift amount in the vertical direction between frames. The reason why the maximum shift amount in the horizontal direction between frames is made greater than the maximum shift amount in the vertical direction between frames is because, for example, in the case that the local moving object is a vehicle, the vehicle generally often moves in the horizontal direction. In addition, a vertically swinging and horizontally flowing motion particularly simulates human walking.

In the step S313, the image processing unit 205, which function as a first generating unit, generates a third image group including superimposed images obtained by superimposing the second images on the frame images (a first generating step). In the present embodiment, based on the superimposing positions determined in the step S312, the partial image is superimposed on the background image patch. In addition, in the step S313, two partial images different in at least one of the shape and the size are superimposed. It should be noted that the number of the partial images to be superimposed is not limited to two, but may be one or three or more. As shown in FIG. 4B, first, a partial image corresponding to the first local moving object is superimposed on a background image patch 401, a background image patch 402, a background image patch 403, and a background image patch 404. As a result, a local moving object 411, a local moving object 412, a local moving object 413, and a local moving object 414 flow leftward on the background image patch 401, the background image patch 402, the background image patch 403, and the background image patch 404. In addition, the partial image 425, which is obtained from the foreground image 420 and corresponds to the second local moving object, is superimposed on the background image patch 401, the background image patch 402, the background image patch 403, and the background image patch 404. As a result, a local moving object 421, a local moving object 422, a local moving object 423, and a local moving object 424 flow rightward on the background image patch 401, the background image patch 402, the background image patch 403, and the background image patch 404. It should be noted that in the case that the partial image lies off the background image patch when being superimposed, only a region of the partial image that becomes within the background image patch may be selectively superimposed. In addition, when the partial image is superimposed, the borderlines of the partial image may be blurred to blend with the background image, or the partial image may be alpha-blended (α-blended) with the background image without completely shielding the background image. It should be noted that in order to deal with the camera shake correction remaining described above, although it is difficult to see in FIG. 4B, all the background image patches (the background image patch 401, the background image patch 402, the background image patch 403, and the background image patch 404) are also shifted within a range of ±2 pixels.

In the step S314, the image obtaining unit 204, which functions as a third obtaining unit, obtains the basis frame image of the third image group as a training image (a third obtaining step). In the present embodiment, for the burst image patch generated by the processing up to the step S313, the image patch of the basis frame image (in the present embodiment, the basis frame image is the frame image in the first frame) is determined as the training image. As described above, the machine learning of the image processing model is supervised learning. In this case, the training image becomes training data.

In the step S315, the image processing unit 205, which functions as a second generating unit, generates an input image group by performing a predetermined image processing with respect to the third image group (the superimposed images) (a second generating step). In the present embodiment, the input image group is generated by performing the predetermined image processing with respect to the burst image patch generated by the processing up to the step S313. It should be noted that the image processing target on which the predetermined image processing is performed is not limited to the third image group, and may be, for example, the frame images and the second images. In addition, examples of the predetermined image processing include at least one process of processes described below. Although it is not specifically shown in FIGS. 4A and 4B, for example, in the case of aiming at noise reduction by combining the plurality of images, it is preferable to perform a process of adding noises. In the process of adding the noises, it is particularly preferred to add a noise whose intensity corresponds to a sensitivity targeted by the image processing model. In addition, in the case of aiming at a high dynamic range (an HDR) by combining the plurality of images, it is preferable to perform a process of narrowing a dynamic range. In the process of narrowing the dynamic range, it is particularly preferable to perform a process of resulting in overexposure or underexposure. In addition, in the case of aiming at super resolution by combining the plurality of images, it is preferable to perform a process of lowering a resolution. Such motion learning using the local moving objects is capable of being applied to all aspects of realizing high image quality by combining the plurality of images. It should be noted that the predetermined image processing may be performed after the partial image is superimposed on the background image patch, but the partial image may be superimposed on the background image patch after the predetermined image processing is performed with respect to the background image patch and the partial image, respectively.

In the step S316, the error calculating unit 206 calculates an error between the output image, which is outputted from the image processing model by inputting the input image group into the image processing model, and the training image. In the present embodiment, the error calculating unit 206 calculates the error between the multiple composite output image, which is obtained by inputting the input image group generated in the step S315 into the image processing model, and the training image, which is determined in the step S314. The error is not particularly limited, and may be, for example, an average absolute error.

In the step S317, the learning unit 207 performs learning of the image processing model (trains the image processing model) based on the error calculated in the step S316 (a learning step). In the present embodiment, the learning unit 207 updates the parameters of the image processing model by an error back propagation method so as to minimize the error calculated in the step S316. As a result, according to the result of the learning performed by the learning unit 207, the superimposing positions of the partial image (the local moving object) on each frame image are capable of being made different for each frame image, and this is reflected on the local moving object loop. As a result, as will be described below, it is possible to both improve the image quality and reduce the afterimages when combining the plurality of images. Moreover, in the information processing apparatus 100, according to the result of the learning performed by the learning unit 207, the size of the partial image with respect to each frame image may be made different for each frame image. This configuration further contributes to both improving the image quality and reducing the afterimages when combining the plurality of images.

In the step S318, the learning unit 207 exits the learning loop and stores the image processing model that has been learned (trained) in the storage unit 201. The information processing apparatus 100 is capable of using the learned image processing model (the image processing model that has been learned) for the inference.

As described above, in the information processing apparatus 100, the image patch of the basis frame is set as the training image, and the input image group is generated by performing the process of adding the noises or the like with respect to the burst image patch to which motion between the frame images is given. As a result, the learning (the training) is performed so that the image quality such as the resolution feeling is improved for an area where there is no motion (or the motion is negligible), and the afterimages are reduced for an area where there is the motion. As a result of this learning (this training), it is possible to both improve the image quality and reduce the afterimages when combining the plurality of images. For example, it is possible to achieve a high resolution feeling (image quality improvement), which is an advantage of combining the plurality of images, while properly reducing the afterimages of the moving object such as a human or a vehicle. It should be noted that for the local moving object whose afterimages should be properly reduced by the output of combining the plurality of images, in order to ensure that a variety of shapes can be learned, the superimposing positions on the background image patches may be determined in the step S312 so that a plurality of partial images overlaps in the training image.

In addition, in the present embodiment, although the image obtaining unit 204 functions as the first obtaining unit, the second obtaining unit, and the third obtaining unit, this is not limitative. For example, parts that function as the first obtaining unit, the second obtaining unit, and the third obtaining unit may be separated, respectively. In addition, in the present embodiment, although the image processing unit 205 functions as the first generating unit and the second generating unit, this is not limitative. For example, parts that function as the first generating unit and the second generating unit may be separated, respectively.

In addition, in the information processing apparatus 100, it is preferred that at least one of the shift probability and the shift amount in the shifting processing performed in the step S308 is increased as a sensitivity of an image to be learned by the image processing model (the sensitivity of the image that is a learning target of the image processing model) increases. Moreover, in the information processing apparatus 100, it is preferred that at least one of the shift probability and the shift amount in the shifting processing is increased as the size of the training image decreases. Furthermore, in the information processing apparatus 100, it is preferred that the shift probability in the shifting processing is decreased as the shift amount in the shifting processing increases. By combining these configurations as appropriate, it is possible to obtain a more preferable image quality.

Next, other embodiments of the present invention will be described. When the inference is performed with the image processing model that has been learned (trained) by using the local moving objects, there may be a case where a relatively large moving object in a high-sensitivity image is reproduced as if it is a collection of smaller moving objects particularly in a dark place. This can be alleviated by learning as much as possible large moving objects that exceed the image patch size, and hence a large shift of the entire image patch, for example, shown in FIG. 4A may be combined. Accordingly, first, for the motion learning parameters obtained in the step S302, the shift probability (=0.5 (50%)) of the entire image patch is redefined as a first shift probability. In addition, the maximum horizontal shift amount and the maximum vertical shift amount (=2 pixels) are redefined as a first maximum horizontal shift amount and a first maximum vertical shift amount. In addition, separately from these, for example, a second shift probability of the entire image patch is defined as 0.01 (1%), and a second maximum horizontal shift amount and a second maximum vertical shift amount are defined as 32 pixels. Here, the second shift probability is set smaller than the first shift probability, and the second maximum horizontal shift amount and the second maximum vertical shift amount are set greater than the first maximum horizontal shift amount and the first maximum vertical shift amount. The reason why the second shift probability is set to be a small probability is that if the entire image patch is largely shifted with a large probability, a phenomenon such as a decrease in the resolution feeling of the multiple composite output will occur.

Then, in the step S308, the horizontal shift amount and the vertical shift amount of the background image patch in the reference frame are determined as described below. When performing this determination, first, a random number from 0 to 1 is generated. Then, in the case that the random number is equal to or less than the first shift probability (=0.5), based on the first maximum horizontal shift amount and the first maximum vertical shift amount, the horizontal shift amount and the vertical shift amount of the background image patch are determined by randomly selecting from integers within a range of ±2 pixels, respectively. In addition, in the case that the random number is equal to or more than 1−the second shift probability (1−0.01=0.99), based on the second maximum horizontal shift amount and the second maximum vertical shift amount, the horizontal shift amount and the vertical shift amount of the background image patch are determined by randomly selecting from integers within a range of ±32 pixels, respectively. In addition, in the case that the random number is one of other values, the horizontal shift amount and the vertical shift amount of the background image patch are determined as 0 pixel, respectively. In this way, by properly combining learning of the local moving objects and shifting of the entire image patch, it is possible to obtain a more preferable image quality. It should be noted that the second shift probability, the second maximum horizontal shift amount, and the second maximum vertical shift amount may be increased for a high-sensitivity image processing model with a worse S/N ratio. In addition, the smaller the local moving object to be learned, that is, the smaller the image patch size during learning, the larger the second shift probability, the second maximum horizontal shift amount, and the second maximum vertical shift amount may be.

Moreover, the motion learning using the local moving objects is also capable of being applied to, for example, a video processing model into which a plurality of video frame images is sequentially inputted and from which a composite video frame image obtained by combining the plurality of video frame images is sequentially outputted, in addition to an image processing model into which a plurality of burst images is inputted and from which a composite image obtained by combining the plurality of burst images is outputted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-009400, filed on Jan. 25, 2023, which is hereby incorporated by reference herein in its entirety.

What is claimed is:

1. An image processing apparatus that performs learning of an image processing model for combining a plurality of images, the image processing apparatus comprising:

at least one processor; and a memory coupled to the at least one processor storing instructions that, when executed by the at least one processor, cause the at least one processor to function as a plurality of units comprising:

(1) a first obtaining unit that obtains a first image group, which includes a plurality of frame images including a basis frame image that becomes a basis for combining the plurality of images;

(2) a second obtaining unit that obtains a second image;

(3) a first generating unit that generates a third image group, which includes superimposed images obtained by superimposing the second image on each of the frame images;

(4) a third obtaining unit that obtains, as a training image, one of the superimposed images corresponding to the basis frame image;

(5) a second generating unit that generates an input image group by performing an image processing with respect to the frame images and the second image, or the superimposed images; and (6) a learning unit that performs the learning of the image processing model based on an error between (a) an output image outputted from the image processing model by inputting the input image group into the image processing model, and (b) the training image, wherein the first generating unit makes superimposing positions of the second image on each of the frame images different for each of the frame images, and wherein the first obtaining unit performs, as a preprocessing when using the image processing model, an aligning processing in which the remaining frame images excluding the basis frame image are shifted in accordance with the basis frame image so that a position of a main subject is aligned between the frame images.

2. The image processing apparatus according to claim 1, wherein the image processing model is a neural network, and wherein the learning unit performs the learning by an error back propagation method so as to minimize the error.

3. The image processing apparatus according to claim 1, wherein the second obtaining unit obtains a plurality of images different in at least one of a shape and a size as a plurality of the second images, and wherein the first generating unit superimposes the plurality of the second images on each of the frame images.

4. The image processing apparatus according to claim 1, wherein in a case that two directions perpendicular to each other on an image are set as a first direction and a second direction, the first generating unit makes a maximum change amount of the superimposing position between the frame images different between in the first direction and in the second direction.

5. The image processing apparatus according to claim 4, wherein the first direction is a horizontal direction and the second direction is a vertical direction, and wherein the maximum change amount of the superimposing position between the frame images is greater in the horizontal direction than in the vertical direction.

6. The image processing apparatus according to claim 1, wherein the first generating unit generates the superimposed images by changing the superimposing positions of the second image so as to flow in one direction in a horizontal direction between the plurality of frame images and by changing the superimposing positions of the second image so as to swing upward and downward in a vertical direction.

7. The image processing apparatus according to claim 1, wherein the first generating unit makes a size of the second image with respect to each of the frame images different for each of the frame images.

8. The image processing apparatus according to claim 1, wherein the frame images are patch images, and wherein the first obtaining unit performs a shifting processing that obtains the first image group by shifting a cutout position of each of the patch images.

9. The image processing apparatus according to claim 1, wherein the first obtaining unit determines a shift amount in the shifting processing according to an accuracy of the preprocessing when using the image processing model.

10. The image processing apparatus according to claim 1, wherein the first obtaining unit increases at least one of a shift probability and a shift amount in the shifting processing as a sensitivity of an image to be learned by the image processing model increases.

11. The image processing apparatus according to claim 1, wherein the first obtaining unit increases at least one of a shift probability and a shift amount in the shifting processing as a size of the training image decreases.

12. The image processing apparatus according to claim 1, wherein the first obtaining unit decreases a shift probability in the shifting processing as a shift amount in the shifting processing increases.

13. The image processing apparatus according to claim 1, wherein as the image processing, the second generating unit performs at least one process of a process of adding noises, a process of narrowing a dynamic range, and a process of lowering a resolution.

14. The image processing apparatus according to claim 1, wherein the second image is an image obtained from the first image group.

15. The image processing apparatus according to claim 1, wherein the second image is a circular image.

16. The image processing apparatus according to claim 1, wherein the second image is an image generated by computer graphics.

17. A control method for controlling an image processing apparatus that performs learning of an image processing model for combining a plurality of images, the control method comprising:

obtaining a first image group, which includes a plurality of frame images including a basis frame image that becomes a basis for combining the plurality of images;

obtaining a second image;

generating a third image group, which includes superimposed images obtained by superimposing the second image on each of the frame images;

obtaining, as a training image, one of the superimposed images corresponding to the basis frame image;

generating an input image group by performing an image processing with respect to the frame images and the second image, or the superimposed images; and performing the learning of the image processing model based on an error between (1) an output image outputted from the image processing model by inputting the input image group into the image processing model, and (2) the training image, wherein in the generating of the third image group, superimposing positions of the second image on each of the frame images are made different for each of the frame images, and wherein, as a preprocessing when the image processing model is used, an aligning processing is performed in which remaining frame images excluding the basis frame image are shifted in accordance with the basis frame image so that a position of a main subject is aligned between the frame images.

18. A non-transitory computer-readable storage medium storing a program for causing a computer to execute a control method for controlling an image processing apparatus that performs learning of an image processing model for combining a plurality of images, the control method comprising:

obtaining a first image group, which includes a plurality of frame images including a basis frame image that becomes a basis for combining the plurality of images;

obtaining a second image;

generating a third image group, which includes superimposed images obtained by superimposing the second image on each of the frame images;

obtaining, as a training image, one of the superimposed images corresponding to the basis frame image;

generating an input image group by performing an image processing with respect to the frame images and the second image, or the superimposed images; and performing the learning of the image processing model based on an error between (1) an output image outputted from the image processing model by inputting the input image group into the image processing model, and (2) the training image, wherein in the generating of the third image group, superimposing positions of the second image on each of the frame images are made different for each of the frame images, and wherein, as a preprocessing when the image processing model is used, an aligning processing is performed in which remaining frame images excluding the basis frame image are shifted in accordance with the basis frame image so that a position of a main subject is aligned between the frame images.

* * * * *